United States Patent
Herrmann et al.

(10) Patent No.: US 8,695,442 B2
(45) Date of Patent: Apr. 15, 2014

(54) SENSOR SYSTEM AND METHOD FOR OPERATING A SENSOR SYSTEM

(75) Inventors: Ingo Herrmann, Friolzheim (DE); Karl-Franz Reinhart, Weinsberg (DE); Daniel Herrmann, Tuebingen (DE); Frank Freund, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 322 days.

(21) Appl. No.: 12/387,659

(22) Filed: May 5, 2009

(65) Prior Publication Data

US 2009/0288498 A1    Nov. 26, 2009

(30) Foreign Application Priority Data

May 20, 2008  (DE) .......................... 10 2008 001 876

(51) Int. Cl.
*G01D 7/00*    (2006.01)

(52) U.S. Cl.
USPC .................................................. 73/862.046

(58) Field of Classification Search
USPC ........ 73/862.046, 862.045–862.048; 327/407
See application file for complete search history.

(56) References Cited

U.S. PATENT DOCUMENTS

| | | | | |
|---|---|---|---|---|
| 3,970,990 | A * | 7/1976 | Carson | 382/324 |
| 5,055,838 | A * | 10/1991 | Wise et al. | 340/870.37 |
| 5,900,767 | A * | 5/1999 | Bird et al. | 327/407 |
| 5,912,578 | A * | 6/1999 | Bird | 327/407 |
| 6,028,309 | A * | 2/2000 | Parrish et al. | 250/332 |
| 6,494,616 | B1 * | 12/2002 | Tokhtuev et al. | 374/137 |
| 6,578,436 | B1 * | 6/2003 | Ganapathi et al. | 73/862.046 |
| 6,694,826 | B2 * | 2/2004 | Kiribayashi et al. | 73/862.046 |
| 7,099,497 | B2 * | 8/2006 | Chou et al. | 382/124 |
| 7,514,842 | B2 * | 4/2009 | Scott | 310/316.01 |
| 7,638,350 | B2 * | 12/2009 | Deconde et al. | 438/53 |
| 7,902,771 | B2 * | 3/2011 | Shteynberg et al. | 315/307 |
| 2008/0088595 | A1 * | 4/2008 | Liu et al. | 345/173 |

FOREIGN PATENT DOCUMENTS

DE    10 2006 028 435    12/2007

* cited by examiner

*Primary Examiner* — Lisa Caputo
*Assistant Examiner* — Octavia Davis-Hollington
(74) *Attorney, Agent, or Firm* — Kenyon & Kenyon LLP

(57) ABSTRACT

A sensor system has a first sensor-element block and a second sensor-element block, at least one first sensor element and one second sensor element are assigned to the first sensor-element block, and at least one third sensor element is assigned to the second sensor-element block. The third sensor element is situated between the first and second sensor elements.

8 Claims, 1 Drawing Sheet

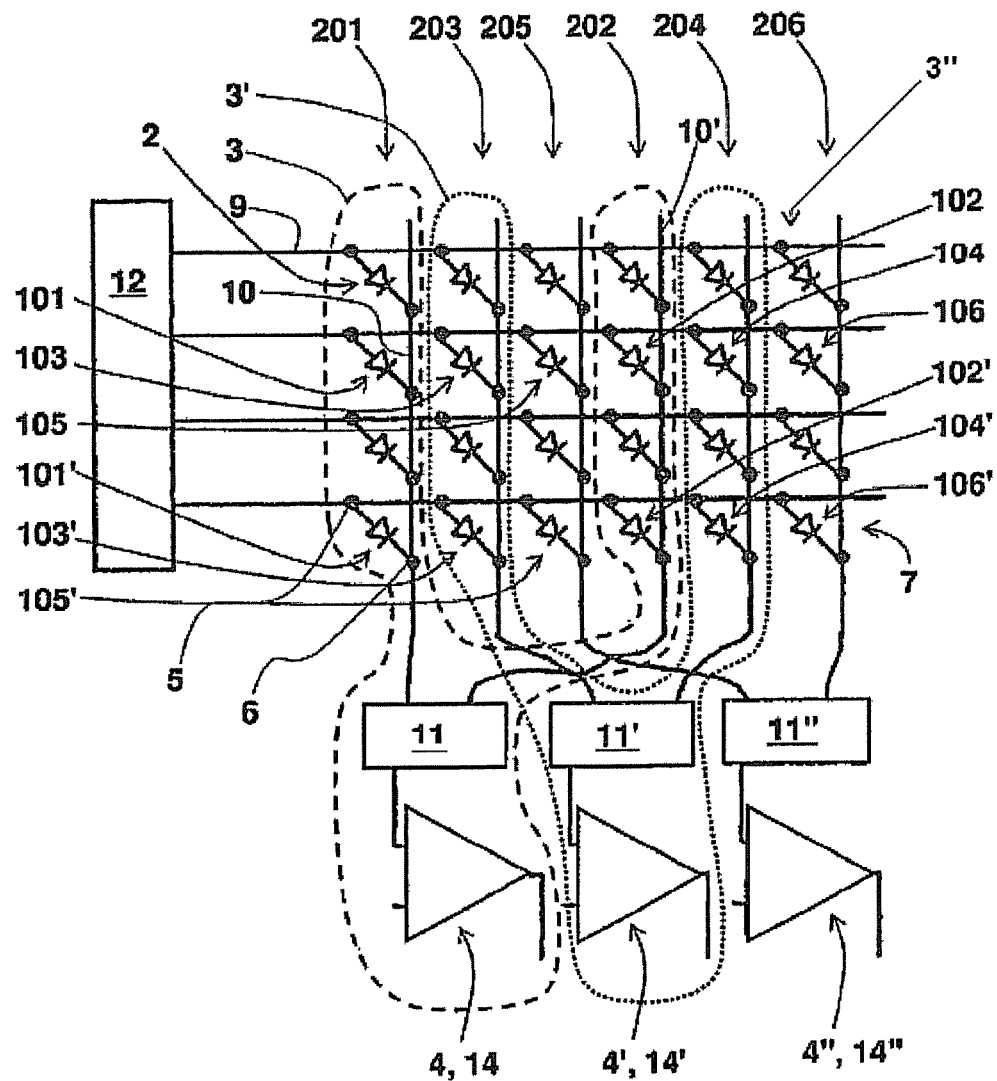

SENSOR SYSTEM AND METHOD FOR OPERATING A SENSOR SYSTEM

BACKGROUND OF THE INVENTION

1. Field of the Invention

The present invention relates to a sensor system incorporating a plurality of sensor element blocks configured to be evaluated in parallel.

2. Description of Related Art

Sensor systems such as this are generally familiar. For example, published German Patent document 10 2006 028 435 describes a sensor for spatially resolved detection, the sensor including a substrate, a micro-patterned sensor element having an electrical property whose value changes as a function of temperature, particularly a diode, and a membrane disposed above a cavity in the substrate, and the sensor element being located on a bottom side of the membrane. The sensor elements include diode pixels, in particular able to be contacted via individual leads, a plurality of diode pixels preferably being configured in a diode-pixel array and being connected to shared leads via the individual leads, so that a sequential readout of the individual diode pixels is made possible via a successive addressing of the individual diode pixels.

BRIEF SUMMARY OF THE INVENTION

The sensor system and the associated method of the present invention have the advantage that, using comparatively simple means, the readout speed of the sensor system is markedly increased compared to the related art without the occurrence of temporal artefacts. This is achieved by combining sensor elements to form sensor-element blocks which are evaluated in parallel and which are interlaced. An interlaced configuration of two sensor-element blocks in accordance with the present invention means, in particular, that at least one sensor element of one sensor-element block is disposed between two sensor elements of another sensor-element block. By splitting the sensor elements into a plurality of sensor-element blocks able to be evaluated in parallel, the image rate and therefore the readout speed of the sensor system is increased. At the same time, the interlacing of the sensor-element blocks prevents the occurrence of temporal artefacts, since sensor elements which lie comparatively close together, and especially adjacent sensor elements are assigned to different sensor-element blocks, and consequently are evaluated in parallel. Therefore, time delays in the evaluation of a plurality of sensor elements occur merely in the case of sensor elements situated comparatively far apart. Temporal artefacts like, for example, an object moving comparatively quickly through a visual field of the sensor system no longer being perceived as moving straight or continuously, but rather as moving erratically or in delayed fashion, are therefore prevented using means which are comparatively simple and cost-effective to implement, while the signal quality remains constant. In contrast, the signal quality would be considerably negatively influenced in response to a mere increase of the image rate. By the assignment of the first sensor element to the first sensor-element block and the third sensor element to the second sensor-element block, a parallel evaluation, particularly of the adjacent first and third sensor elements, is possible in a first method step, the second sensor element disposed comparatively further away from the first sensor element not being evaluated until the second method step. The essentially isochronous evaluation, particularly of the adjacent first and third sensor elements, therefore permits a substantially judder-free evaluation of an object moving comparatively quickly through the visual field of the first and third sensor elements, without impairment of the signal quality.

According to one further refinement, a fourth sensor element is further assigned to the second sensor-element block, the second sensor element being situated between the third and the fourth sensor element. Particularly advantageously, the second sensor element is therefore situated comparatively close and, in particular, adjacent to the fourth sensor element, so that even in those partial areas of the visual field of the sensor system in which the second and fourth sensor elements are disposed, an essentially isochronous evaluation of the adjacent sensor elements is attained, and according to this principle, temporal artefacts are suppressed in the entire sensor system, i.e., in the entire visual field of the sensor system by the complete interlacing of the sensor-element blocks, and at the same time, the readout speed is increased.

According to a further development, the sensor system includes a third sensor-element block, to which at least one fifth sensor element is assigned that is disposed between the second and the third sensor element. A higher readout speed of the sensor system is attainable particularly advantageously by the assignment of the fifth sensor element to the third sensor-element block, since in addition to the first and third sensor elements, the fifth sensor element is also able to be read out in the first method step, the positioning of the fifth sensor element between the second and the third sensor element, i.e., thus in the vicinity of the second sensor element, serving to suppress temporal artefacts.

According to another refinement, additional sensor elements are assigned to additional sensor-element blocks, at least one additional sensor element of each additional sensor-element block being situated between the first sensor element and the second sensor element. The readout speed of the sensor system is increased more and more by the further subdivision of the sensor system into additional sensor-element blocks, since the additional sensor elements are read out along at the same time in each method step. In this context, the interlacing of the additional sensor-element blocks permits the suppression of temporal artefacts.

According to a further development, the first sensor element is disposed in a first column with further first sensor elements and/or the second sensor element is disposed in a second column with further second sensor elements and/or the third sensor element is disposed in a third column with further third sensor elements and/or the fourth sensor element is disposed in a fourth column with further fourth sensor elements and/or the fifth sensor element is disposed in a fifth column with further fifth sensor elements. Therefore, especially preferred, in each case an entire column of sensor elements with the respective further sensor elements is part of one sensor-element block, in particular, a plurality of further sensor elements being disposed in a plurality of rows in the respective column, so that the entire sensor system may be realized in an especially compact space in a row-column structure. Alternatively, the terms row and column are reversible, so that a column-row structure of the interlaced sensor-element blocks is also subject matter of the present invention.

According to another development, the sensor elements and the further sensor elements of each column are electro-conductively interconnected via first lines, so that each sensor element of a column is able to be evaluated or controlled especially advantageously via the corresponding shared first line, thus reducing the contacting expenditure considerably.

According to another refinement, the at least first and second sensor elements are connected via a first multiplexer to a first evaluating means, the at least third and fourth sensor elements are connected via a second multiplexer to a second evaluating means and the at least fifth sensor element is connected via a third multiplexer to a third evaluating means. In addition, further sensor elements are connected via further multiplexers to further evaluating means. Therefore, exactly one multiplexer and exactly one evaluating means are assigned to each sensor-element block, so that in several and, in particular, consecutive method steps, different columns of a respective sensor-element block are connected sequentially by the respective multiplexer to the respective evaluating means, and therefore each column of the respective sensor-element block is able to be evaluated in succession by the respective evaluating means. Particularly advantageously, due to the interlacing of the sensor-element blocks with one another, essentially adjacent columns which, in particular, are assigned to different sensor-element blocks, are evaluated in parallel and nearly simultaneously.

According to a further development, the first, the second, the third, the fourth and/or the fifth sensor element are disposed in one row and, in particular, are electroconductively interconnected via a second line, the second line preferably being addressed by an address multiplexer. The respective rows of the columns are therefore interconnected via second lines. Especially advantageously, at least one row through all columns is addressed by the address multiplexer, so that the sensor elements in this row are each able to be evaluated through the first lines.

According to another refinement, the sensor elements include diodes and/or the sensor system includes a sensor for spatially-resolved detection, particularly for the spatially-resolved measurement of temperature, radiation and/or a fingerprint and/or the sensor system includes a sensor for detecting a concentration of gas. Therefore, the readout speed of the sensor system, considerably increased compared to the related art, especially advantageously permits a spatially resolved detection of comparatively short-lived events and/or comparatively rapidly moving objects.

A further subject matter of the present invention is a method for operating a sensor system, where in a first method step, the first sensor element is evaluated by the first evaluating means and the third sensor element is evaluated by the second evaluating means, in a second method step, the second sensor element is evaluated by the first evaluating means and preferably the fourth sensor element is evaluated by the second evaluating means and/or in the first method step, the fifth sensor element is further evaluated by the third evaluating means. Thus, as described above, an evaluating speed is attainable which is markedly faster compared to the related art, at the same time the formation of temporal artefacts being suppressed.

According to a further development, in each method step, the address multiplexer addresses the sensor elements and the further sensor elements in each column row-by-row in succession. Therefore, particularly advantageously, a corresponding column of sensor elements is addressed by the multiplexers in each method step, while in a plurality of method substeps, all rows of the corresponding columns are addressed sequentially by the address multiplexer in each method step, Therefore, the sensor system is read out column-by-column in successive method steps, and row-by-row in successive method substeps, in particular, at least one sensor element of each sensor-element block being read out in each method substep.

BRIEF DESCRIPTION OF THE DRAWING

FIG. 1 shows a schematic plan view of a circuit configuration according to an exemplary embodiment of the present invention.

DETAILED DESCRIPTION

As shown in FIG. 1, a circuit configuration according to an exemplary embodiment of the present invention has four rows 7 of circuit elements 2, particularly diodes, each having first and second terminals 5, 6. One of rows 7 includes a first and a second sensor element 101, 102, which together are assigned to a first sensor-element block 3, a third and fourth sensor element 103, 104, which together are assigned to a second sensor-element block 3', and a fifth and sixth sensor element 105, 106, which are assigned to a third sensor-element block 3". Third and fifth sensor elements 103, 105 are situated between first and second sensor elements 101, 102, while second sensor element 102 is situated between fifth and fourth sensor elements 105, 104. Thus, the sensor-element blocks are interlaced in such a way that, disposed between at least two sensor elements of one sensor-element block is always at least one sensor element of at least one other sensor-element block.

Furthermore, in a first column 201 having first sensor element 101, three further first sensor elements 101' of first sensor-element block 3 are disposed; in a second column 202 having second sensor element 102, additionally three further second sensor elements 102' of first sensor-element block 3 are disposed; in a third column 203 having third sensor element 103, three further third sensor elements 103' of second sensor-element block 3' are also disposed; furthermore, in a fourth column 204 having fourth sensor element 104, three further fourth sensor elements 104' of second sensor-element block 3' are disposed; in a fifth column 205 having fifth sensor element 105, additionally three further fifth sensor elements 105' of third sensor-element block 3" are disposed; and in a sixth column 206 having sixth sensor element 106, three further sixth sensor elements 106' of third sensor-element block 3" are also disposed.

First terminals 5 of all sensor elements in a row are in each case electroconductively connected via first lines 9 one with another and to an address multiplexer, while second terminals 6 of all sensor elements in a column are in each case electroconductively connected one with another via second lines 10. First and second columns 201, 202 are connected by second lines 10 and a first multiplexer 11 to a first evaluating means 4, third and fourth columns 203, 204 are connected by second lines 10 and a second multiplexer 11' to a second evaluating means 4' and fifth and sixth columns 205, 206 are connected by second lines 10 and a third multiplexer 11" to a third evaluating means 4", first, second and third evaluating means 4, 4', 4" in particular including first, second and third amplifiers 14, 14', 14". Therefore, each sensor-element block 3, 3', 3" is assigned exactly one multiplexer 11, 11', 11" and one evaluating means 4, 4', 4", each multiplexer 11, 11', 11" connecting through exactly one column of corresponding sensor-element block 3, 3', 3" to evaluating means 4, 4', 4" of corresponding sensor-element block 3, 3', 3", and address multiplexer 12 always addressing or activating exactly one row 7 of sensor system 1.

In an exemplary first method step, first evaluating means 4 evaluates first sensor element 101 in first column 201 and a first row, and parallel thereto, third and fifth sensor elements 103, 105 in the third and fifth columns, respectively, and in each case in the first row are evaluated by second and third evaluating means 4', 4", respectively. In method substeps, the first row is deactivated by the multiplexer and a second row is activated, so that the sensor elements of the first, third and fifth columns in the second row are evaluated by first, second and third evaluating means 4, 4', 4". In additional method substeps, further rows are activated sequentially according to this pattern until all rows are evaluated. Thereupon, in a second method step, second column 202 is connected through to first evaluating means 4 by first multiplexer 11, fourth column 204 is connected through to second evaluating means 4' by second multiplexer 11' and sixth column 206 is connected through to third evaluating means 4" by third multiplexer 11". To evaluate all sensor elements in second, fourth and sixth columns 202, 204 206, all rows are again activated sequentially one after another by address multiplexer 12.

According to the present invention, this readout scheme is expandable to any number of sensor elements, columns, rows and sensor-element blocks. Furthermore, it would be conceivable to replace the address multiplexer by a plurality of row multiplexers, and to divide the sensor elements in the rows according to the same or a similar pattern as the columns into row sensor-element blocks, which are likewise interlaced. Furthermore, not only are row-wise or column-wise interlacings of sensor-element blocks subject matter of the present invention, but also any other conceivable type of interlacing of sensor-element blocks like, for example, also the interlacing along concentric rings or curves about a midpoint of the sensor system or generally along a freely selectable metric on the sensor system.

What is claimed is:

1. A sensor system, comprising:
   a first sensor-element block including at least one first sensor element and one second sensor element; and
   a second sensor-element block including at least one third sensor element;
   wherein the third sensor element is situated between the first sensor element and the second sensor element;
   a fourth sensor element assigned to the second sensor-element block, wherein the second sensor element is situated between the third sensor element and the fourth sensor element;
   a third sensor-element block including at least one fifth sensor element situated between the second sensor element and the third sensor element,
   wherein the sensor-element blocks are interlaced so that at least one sensor element of at least one sensor-element block is disposed between at least two sensor elements of one other sensor-element block,
   wherein the first and second sensor elements are connected via a first multiplexer to a first evaluating unit, and wherein the third and fourth sensor elements are connected via a second multiplexer to a second evaluating unit, and wherein the fifth sensor element is connected via a third multiplexer to a third evaluating unit such that each sensor-element block is assigned exactly one multiplexer and one evaluating unit.

2. The sensor system as recited in claim 1, further comprising:
   at least one additional sensor-element block including at least one additional sensor element situated between the first sensor element and the second sensor element.

3. The sensor system as recited in claim 1, wherein at least one of: (a) at least two first sensor elements are disposed in a first column of the first sensor-element block; (b) at least two second sensor elements are disposed in a second column of the first sensor-element block; (c) at least two third sensor elements are disposed in a third column including the second sensor-element block; (d) at least two fourth sensor elements are disposed in a fourth column including the second sensor-element block; and (e) at least two fifth sensor elements are disposed in a fifth column including the third sensor-element block.

4. The sensor system as recited in claim 3, wherein the sensor elements in each column are electro-conductively interconnected by a connection line.

5. The sensor system as recited in claim 1, wherein the first, second, third, fourth and fifth sensor elements are disposed in one row and electro-conductively interconnected by a further connection line addressed by an address multiplexer.

6. The sensor system as recited in claim 1, wherein each sensor element includes a diode, and wherein the sensor system is configured for at least one of: (a) detection of concentration of gas; and (b) spatially-resolved measurement of at least one of temperature, radiation and fingerprint.

7. A method for operating a sensor system having (a) a first sensor-element block including at least one first sensor element and one second sensor element, and (b) a second sensor-element block including at least one third sensor element, wherein the third sensor element is situated between the first sensor element and the second sensor element, and wherein a fourth sensor element is assigned to the second sensor-element block, the second sensor element being situated between the third sensor element and the fourth sensor element, the method comprising:
   in a first method step, evaluating the first sensor element by a first evaluating unit and evaluating the third sensor element by a second evaluating unit;
   in a second method step, evaluating the second sensor element by the first evaluating unit and evaluating the fourth sensor element by the second evaluating unit,
   wherein the sensor system includes a third sensor-element block including at least one fifth sensor element situated between the second sensor element and the third sensor element, and wherein, in the first method step, the fifth sensor element is evaluated by a third evaluating unit,
   wherein the sensor-element blocks are interlaced so that at least one sensor element of at least one sensor-element block is disposed between at least two sensor elements of one other sensor-element block,
   wherein the first and second sensor elements are connected via a first multiplexer to the first evaluating unit, and wherein the third and fourth sensor elements are connected via a second multiplexer to the second evaluating unit, and wherein the fifth sensor element is connected via a third multiplexer to the third evaluating unit such that each sensor-element block is assigned exactly one multiplexer and one evaluating unit.

8. The method as recited in claim 7, wherein in each method step, an address multiplexer addresses the sensor elements in each column in a successive row-by-row sequence.

* * * * *